United States Patent [19]

Rothamel

[11] 4,441,355
[45] Apr. 10, 1984

[54] APPARATUS AND METHOD FOR DISPLAYING UNBALANCE OF ROTORS DURING MEASUREMENT

[75] Inventor: Karl Rothamel, Darmstadt, Fed. Rep. of Germany

[73] Assignee: Gebr. Hofmann GmbH & Co. KG, Maschinenfabrik, Darmstadt, Fed. Rep. of Germany

[21] Appl. No.: 281,784

[22] Filed: Jul. 9, 1981

[30] Foreign Application Priority Data

Jul. 10, 1980 [DE] Fed. Rep. of Germany ....... 3026232

[51] Int. Cl.³ .............................................. G01M 1/22
[52] U.S. Cl. ........................................ 73/1 R; 73/462
[58] Field of Search .................. 73/1 R, 462, 464, 465

[56] References Cited

U.S. PATENT DOCUMENTS 3,280,638 10/1966 Hack ..................................... 73/462

Primary Examiner—James J. Gill
Attorney, Agent, or Firm—Fleit, Jacobson, Cohn & Price

[57] ABSTRACT

A method for displaying the amount of unbalance during rotation of a rotor, preferably in two correction planes, includes adjustment of the amounts of unbalance determined during measurement by a factor obtained during calibration. The method is characterized by measuring unbalance forces of known magnitude and comparing them with predetermined nominal data identical to the known unbalance forces during measurement, and by adjusting the amounts of unbalance of the rotor determined during measurement by the result of the above comparison. The apparatus of the invention comprises an unbalance measuring device, data memories for providing nominal reference data, comparator circuits for comparing the measured values derived from an auxiliary shaft with the nominal reference data to determine adjustment values, and multiplier circuits for adjusting the measured values derived from the main shaft in accordance with the adjustment values. The apparatus further comprises a plane separation network for resolving adjusted values in accordance with left and right planes, and meters for displaying the resolved values.

12 Claims, 2 Drawing Figures

APPARATUS AND METHOD FOR DISPLAYING UNBALANCE OF ROTORS DURING MEASUREMENT

BACKGROUND OF THE INVENTION

1. Field of the Invention

The present invention relates to an apparatus and method for displaying the unbalance of rotors during measurement thereof, the rotors being clamped on a motor-driven shaft.

2. Description of the Prior Art

Apparatuses and techniques for balancing unbalanced rotors have been known in various forms. Typical of such prior art apparatuses and techniques are those disclosed in German Pat. Nos. DE-AS 2732738 and DE-AS 2701876.

The latter relate to equipment for balancing rotors, epsecially automobiles, in two correction planes, wherein the rotor is mounted on a clamping shaft, with the clamping shaft being supported directly on the machine housing, or in an intermediate housing and via transducers. Furthermore, the known apparatuses and techniques involve the employment of unbalance measuring devices to determine and read out the amount and location of unbalance.

To calibrate balancing machines of the prior art, a perfect balanced rotor had to be clamped on the shaft, and artificial unbalance created by insertion of an unbalanced mass of known weight. The weight and location of this unbalanced mass were then measured, during rotation of the rotor, by means of an unbalance measuring device, and the meters of the balancing machine were then adjusted accordingly.

Such prior art techniques have been burdened by serious disadvantages. For example, once the meters of the balancing machine were adjusted, the purpose being to insure conversion of the unbalance forces into electrical signals independent of temperature and time, such adjustments could be retained for a long period of time only at considerable expenditure, and only by the use of sophisticated and expensive components. On the other hand, constant accuracy over a long period is especially required of the transducers and the complete electronic measuring unit. Thus, perfect balance in such prior art apparatuses and methods could only be assured if the above-described time-consuming and complicated calibration processes were repeated relatively frequently.

SUMMARY OF THE INVENTION

The present invention relates to an apparatus and method for displaying the amount of unbalance during measurement of rotors, and more particularly to an apparatus and method wherein precise readings of unbalance are maintained substantially indpendent of internal and external influences (such as the environment) upon the unbalance measuring device, even if the latter is exposed to such influences over a lengthy period of time.

The method of the present invention involves a method of displaying the amount of unbalance during measurement of rotors (for example, automobile wheels), preferably in two correction planes, and includes the adjustment of the amounts of unbalance, determined during measurement, by a factor obtained during calibration. The method is further characterized by measuring unbalance forces of known magnitude, and comparing them with predetermined nominal data identical with the known unbalance forces during measurement, and by adjusting the amounts of unbalance of a rotor, determined during measurement, with the results of the above comparison.

The apparatus of the present invention relates to an apparatus for displaying the unbalance during the measurement of rotors clamped on a motor-driven shaft, the latter being supported on transducers provided on the machine housing, the apparatus further comprising an unbalance measuring device for determining and displaying the amount and location of unbalance. The measuring unit has one or more measuring channels, depending upon the number of correction planes, the channels being connected to the transducers and processing the unbalance data of the rotor, as determined during measurement. There is also provided a unit for calibration of the amount of the reading, with the apparatus having an additional rotating unbalance exciter which generates unbalance forces of known magnitude and transmits them to trransducers provided on the machine housing. The exciter has a rotating frequency different from the frequency of rotation of the main rotor shaft, and the transducers are connected through one or several additional measuring channels, depending on the number of correction planes, to comparator circuits. Each comparator circuit is connected to a nominal data memory, and the measuring channels receive the data of the known unbalance forces, as distinguished from the ones of the rotor by their different rotating frequency. Each output of the comparator circuits is connected to a sensitivity adjuster for adjusting the amount of the reading of the unbalance of the rotor, depending on the result contained in the comparison.

As a result of the present invention, it is possible to insure continuous calibration without the necessity of further separate calibrations.

In the apparatus of the present invention, the transducers receive forces of known magnitude and a frequency different from the one of the rotor during the measuring run. The measured data is then analyzed separately according to frequency, with the forces of known magnitude being compared by a comparator circuit with predetermined stored nominal data (mentioned previously), the latter conforming preferably to the forces of known magnitude, and the unbalance reading of the rotor being adjusted in accordance with the results of the comparison. Preferably, the forces of known magnitude are generated by means of an auxiliary shaft which may be part of the driving motor itself, and which is connected to the clamping shaft by means of gear wheels and/or a toothed belt.

Therefore, it is an object of the present invention to provide an apparatus and method for displaying the amount of unbalance during measurement of rotors clamped on a motor-driven shaft.

It is an additional object of the present invention to provide an apparatus and method for displaying the amount of unbalance during measurement of rotors in two correction planes.

It is an additional object of the present invention to provide an apparatus and method for displaying the amount of unbalance during measurement of rotors, wherein continuous calibration is achieved without the necessity of a plurality of separate calibrations.

The above and other objects which will hereinafter appear, and the nature of the invention, will be more clearly understood by reference to the following description, the appended claims, and the accompanying drawings.

DETAILED DESCRIPTION

The present invention will now be more fully described with reference to FIG. 1, which is a diagram of the apparatus of the present invention.

Figure 1:
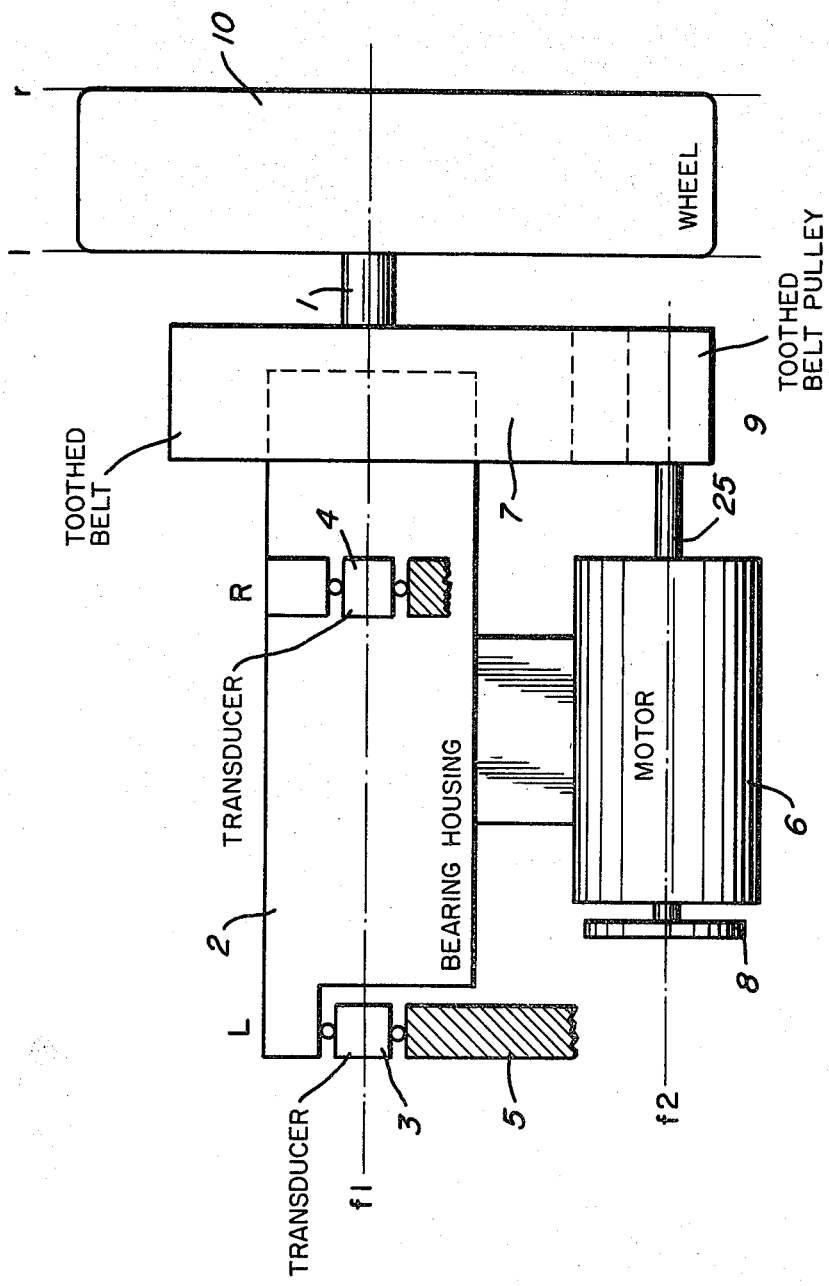
FIG. 1 is a diagram of the apparatus of the present invention.

As seen in FIG. 1, the apparatus of the present invention comprises a clamping shaft 1, a bearing housing 2, transducers 3 and 4, machine housing 5, motor 6, gear wheels and/or a toothed belt 7, a fan wheel 8, a toothed belt pulley 9, and a rotor 10 mounted on the clamping shaft 1. The motor 6 is connected to the toothed belt pulley 9 by means of the arbor 25 of the driving motor 6, the arbor 25 serving as an auxiliary shaft in its parallel position with respect to the clamping shaft 1.

The clamping shaft 1 is rotatably supported in the bearing housing 2. The housing 2 is supported in two planes via three transducers, two transducers 3 and 4 being illustrated in FIG. 1. The driving motor 6 is attached to the housing 2 from below, and is connected to the clamping shaft 1 by means of gear wheels and/or toothed belt 7 so as to insure in-phase rotation.

The driving motor 6 com:prises additional wheels, in particular a fan wheel 8 and/or toothed belt pulley 9, provided with a predetermined unbalance mass. As previously mentioned, the arbor 25 of the driving motor 6 serves as an auxiliary shaft in its parallel position with respect to the clamping shaft 1. It should be recognized that the forces of known magnitude can, however, also be transmitted to the transducer 3 and 4 by other suitable means.

In order to insure ideal selection between measurements derived from the clamping shaft 1 and the auxiliary shaft 25, the rotating frequencies of the driving motor 6 and the clamping shaft 1 differ, preferably, by an integral speed ratio (for example, 1:2).

In operation, a rotor 10 to be balanced, preferably in two planes, is clamped onto the shaft 1. During rotation, the unbalance forces received by the transducers 3 and 4 are transmitted to a measuring system (shown in FIG. 2).

Figure 2:
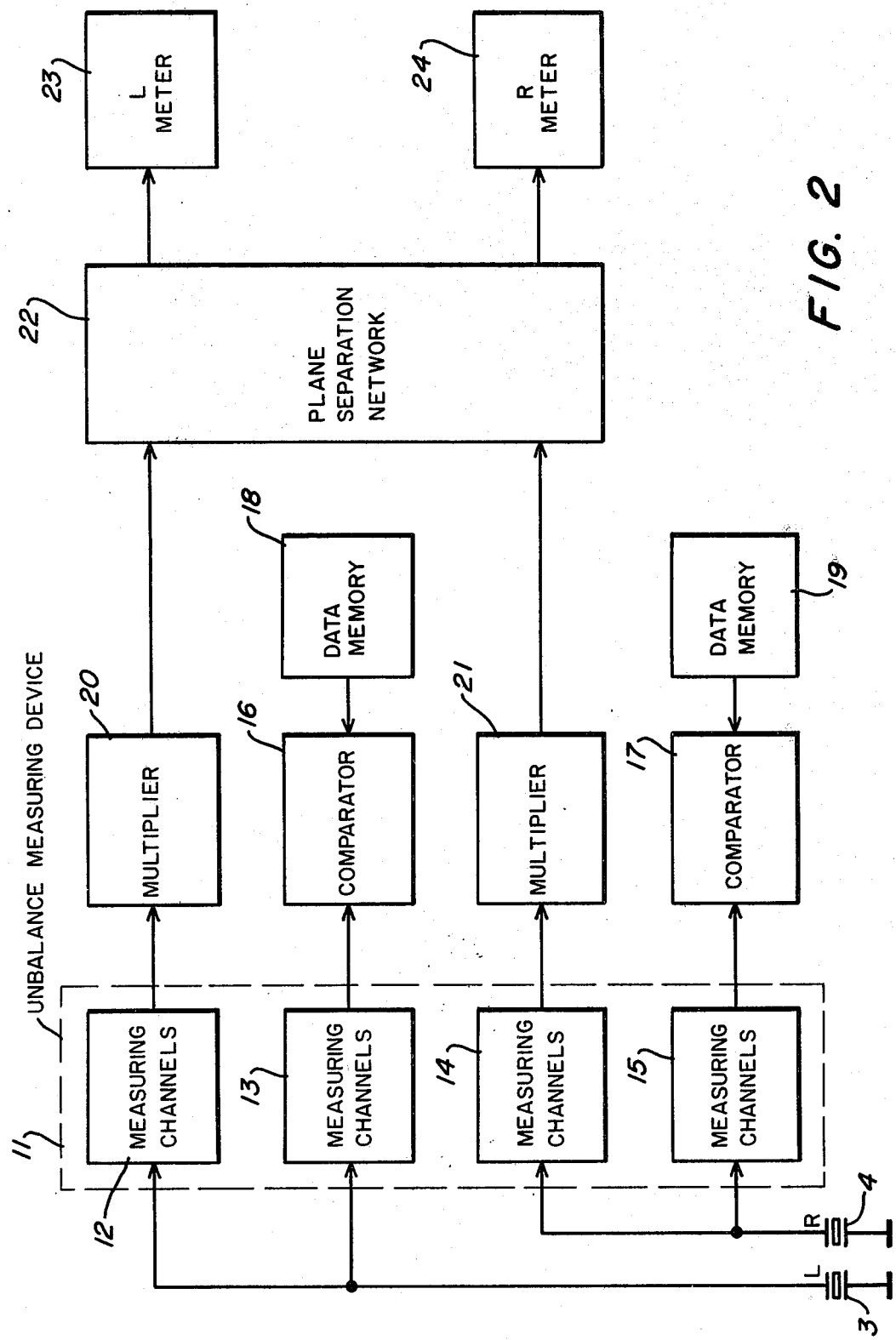
FIG. 2 is a block diagram of the measuring device employed by the apparatus of FIG. 1.

As seen in FIG. 2, the measuring system comprises an unbalance measuring device 11 (consisting of measuring channels 12-15), comparators 16 and 17, data memories 18 and 19, multipliers 20 and 21, separation network 22, and meters 23 and 24.

In operation, the unbalance forces received by transducers 3 and 4 are transmitted to the unbalance measuring device 11, wherein the forces are processed in preferably separate measuring channesl 12-15 according to their frequency and measuring plane. In the specific embodiment shown in FIG. 2, measuring channels 12 and 14 serve to determine the unbalance of the rotor 10 with respect to left (L) and right (R) planes, respectively, while measuring channels 13 and 15 serve to determine the unbalance created and transmitted by the auxiliary shaft 25, with respect to the L and R planes, respectively.

It is to be understood that measuring channels 12-15 are known devices, as disclosed (for example) in German Pat. DE-PS 1108475 (corresponding to British Patent Specification No. 860,847).

Further referring to FIG. 2, it should be noted that transducers 3 and 4 are connected in common to measuring channels 12, 13 and 14, 15, respectively. As a result of the fact that, as previously mentioned, the rotor 10 attached to main shaft 1 (FIG. 1) and the auxiliary shaft 25 are rotated at substantially different rates of rotation (differing, preferably, by an integral speed ratio), it is possible for the main shaft and auxiliary shaft measurement values to be separately distinguished by the measuring channels 12, 14 and 13, 15, respectively.

Thus, the unbalance forces, as received by transducers 3 and 4, are transmitted to the unbalance measuring device 11, wherein the forces are processed in separate measuring channels 12-15 according to the frequency and measuring plane. Moreover, a phase reference signal is provided to the unbalance measuring device 11 by means of known type, the phase reference signal serving to determine the unbalance angle position. For example, a marking or a pin can be placed on the rotating rotor, and the marking or pin can be detected by a photocell or induction sensor, respectively, so that one impulse (constituting the phase reference signal) is produced for each rotation of the rotor 10. The employment of such a phase reference signal for the determination of unbalance size and phase position in the measurement device 11 is further described in the aforementioned German patent (and corresponding British Patent Specification No. 860,847). It should be further noted that, since the rotational rates of rotor 10 and auxiliary shaft 25 are related by a whole number, it is possible to derive, from the phase reference signal for rotor 10, the phase reference signal for auxiliary shaft 25 as well.

Further referring to FIG. 2, the output voltages of measuring channels 13 and 15, which correspond to the unbalance created on and transferred by auxiliary shaft 25 (FIG. 1), are provided to comparator circuit 16 and 17, respectively. Nominal data memories 18 and 19 transmit reference data to comparator circuits 16 and 17, respectively, and a comparison operation is performed. The results of the comparison operations in comparator 16 and 17 provide adjustment signals or values to multipliers 20 and 21, respectively.

The multipliers 20 and 21 are connected directly to measuring channels 12 and 14, respectively, the latter determining the amount and location of the unbalance of the rotor 10. The unbalance amounts are adjusted by multipliers 20 and 21, and the adjusted unbalance values are transmitted to a plane separation network 22. The network 22, in turn, resolves the measured unbalance forces into given correction planes (LR) of the rotor 10.

More specifically, the plane separation network 22 serves to determine the unbalance according to the size and direction of each equalizing plane (L and R). This network 22 is a known network which merely performs conventional processing (using, for example, an analog computer) of the outputs of multipliers 20 and 21, respectively, to resolve the measured unbalance forces into the given correction planes of rotor 10.

The resulting outputs of separation network 22 are provided to meters 23 and 24, respectively, the meter 23 serving to indicate the unbalance according to the size and direction of the left (L) equalizing plane, and the meter 24 serving to indicate the unbalance according to size and direction of the right equalizing plane (R). It should be recognized, however, that the unbalances may also be indicated by similar meters in components for each equalizing plane.

While preferred forms and arrangements have been shown in illustrating the invention, it is to be clearly understood that various changes in detail and arrangement may be made without departing from the spirit and scope of this disclosure.

What is claimed is:

1. An apparatus for displaying the amount of unbalance during measurement of a rotor in two correction planes, said apparatus comprising:
   measuring means for measuring unbalance forces of the rotor and for measuring unbalance forces of known magnitude during measuring of the unbalance forces of the rotor;
   comparing means for comparing the measured unbalance forces of known magnitude with predetermined nominal data to obtain a comparison result; and
   adjusting means for adjusting the measured amounts of unbalance of the rotor in accordance with the comparison result;
   said measuring means comprising:
   a motor-driven shaft on which said rotor is mounted for rotation at a first rotational speed;
   a rotating unbalance exciter for generating said unbalance forces of known magnitude, said rotating unbalance exciter operating in accordance with a rotational frequency different from said first rotational frequency of said rotor;
   a pair of transducers, one for each of said two correction planes, for receiving said unbalance forces of the rotor and said unbalance forces of known magnitude, and providing said unbalance forces of the rotor and said unbalance forces of known magnitude as outputs;
   two pairs of measuring channels, one pair for each of said two correcting planes, a first measuring channel of each said pair of measuring channels receiving and measuring the unbalance forces of said rotor to provide to said adjusting means measured unbalance force outputs comprising the measured amounts of unbalance of the rotor, and a second measuring channel of each said pair of measuring channels receiving and measuring said unbalance forces of known magnitude to provide to said comparing means measured unbalance force outputs comprising said measured unbalance forces of known magnitude;
   an auxiliary shaft parallel to the motor-driven shaft, said rotating unbalance exciter being mounted on said auxiliary shaft; and
   a driving motor of said motor-driven shaft, and wherein said auxiliary shaft is a part of said driving motor.

2. The apparatus of claim 1, wherein said adjusting means comprises multiplier circuitry.

3. The apparatus of claim 1, wherein said adjusting means provides adjusted outputs, said apparatus further comprising separation means for separating said adjusted outputs so as to resolve said adjusted outputs into adjusted measured values of unbalance with respect to a first of said two correction planes and adjusted measured values of unbalance with respect to a second of said two correction planes.

4. The apparatus of claim 3, further comprising display means, one for each of said two correction planes, for displaying said adjusted measured value of unbalance with respect to said first and second of said two correction planes, respectively.

5. The apparatus of claim 1, further comprising nominal data memory means for providing said predetermined nominal data to said comparing means.

6. The apparatus of claim 1, further comprising a toothed belt for rotatably connecting said motor-driven shaft and said auxiliary shaft.

7. The apparatus of claim 1, further comprising gear wheels for rotatably connecting said motor-driven shaft and said auxiliary shaft.

8. The apparatus of claim 1, wherein said motor-driven shaft and said auxiliary shaft rotate at different speeds related by an integral speed ratio.

9. The apparatus of claim 1, further comprising a common frame for supporting said motor-driven shaft, said auxiliary shaft, said rotating unbalance exciter, and said driving motor.

10. The apparatus of claim 1, further comprising a common frame for supporting said motor-driven shaft, said auxiliary shaft, and said rotating unbalance exciter.

11. The apparatus of claim 1, wherein said adjusting means comprises a pair of multipliers having multiplier outputs corresponding to the adjusted determined amounts of unbalance of the rotor, and a plane separation network for receiving said multiplier outputs for resolving said multiplier outputs into determined amounts of unbalance of the rotor corresponding to each respective one of said two correction planes.

12. A method for displaying the amount of unbalance during measurement of a rotor in two correction planes, said method comprising:
   measuring unbalance forces of the rotor and simultaneously measuring unbalance forces of known magnitude by a measuring means comprising:
   a motor-driven shaft on which said rotor is mounted for rotation at a first rotational speed;
   a rotating unbalance exciter for generating said unbalance forces of known magnitude, said rotating unbalance exciter operating in accordance with a rotational frequency different from said first rotational frequency of said rotor;
   a pair of transducers, one for each of said two correction planes, for receiving said unbalance forces of the rotor and said unbalance forces of known magnitude, and providing said unbalance forces of the rotor and said unbalance forces of known magnitude as outputs;
   two pairs of measuring channels, one pair for each of said two correcting planes, a first measuring channel of each said pair of measuring channels receiving and measuring the unbalance forces of said rotor to provide to said adjusting means measured unbalance force outputs comprising the measured amounts of unbalance of the rotor, and a second measuring channel of each said pair of measuring channels receiving and measuring said unbalance forces of known magnitude to provide to said comparing means measured unbalance force outputs comprising said measured unbalance forces of known magnitude;
   an auxiliary shaft parallel to the motor-driven shaft, said rotating unbalance exciter being mounted on said auxiliary shaft; and
   a driving motor of said motor-driven shaft, and wherein said auxiliary shaft is a part of said driving motor;
   comparing the measured unbalance forces of known magnitude with predetermined nominal data to obtain a comparison result; and
   adjusting the measured amounts of unbalance of the rotor in accordance with the comparison result.

* * * * *